United States Patent [19]
Bigelow et al.

[11] 3,914,900
[45] Oct. 28, 1975

[54] MEANS AND METHOD FOR PLANTING AND GROWING PLANTS AND CROPS

[76] Inventors: LaVell M. Bigelow; Mark E. Bigelow, both of 816 Turkey Run Road, McLean, Va. 22101

[22] Filed: July 1, 1974

[21] Appl. No.: 484,416

[52] U.S. Cl. .......................... 47/9; 273/33; 47/48.5; 47/37
[51] Int. Cl.² ...................... A01G 9/10; A63B 57/00
[58] Field of Search ............. 71/23, 64; 273/32, 33; 47/58, 57.6, 56, 37, 48.5, 9, 34

[56] References Cited
UNITED STATES PATENTS

| | | | |
|---|---|---|---|
| 1,645,001 | 10/1927 | Hodges | 71/23 |
| 1,880,136 | 9/1932 | Hickok | 47/37 |
| 1,936,988 | 11/1933 | Otwell | 47/37 |
| 2,747,768 | 5/1956 | Raines | 273/33 X |
| 2,776,634 | 1/1957 | Morton | 47/48.5 X |
| 2,812,618 | 11/1957 | Weston | 47/56 |
| 3,220,727 | 11/1965 | Legan | 273/33 |
| 3,273,284 | 9/1966 | Anagnostou | 47/34 |
| 3,384,993 | 5/1968 | Kane | 47/58 |
| 3,755,962 | 9/1973 | Walters et al. | 47/34 |
| 3,821,863 | 7/1974 | Chan | 47/48.5 |

FOREIGN PATENTS OR APPLICATIONS
705,926  3/1954  United Kingdom

*Primary Examiner*—Robert E. Bagwill
*Attorney, Agent, or Firm*—Edwin M. Thomas

[57] ABSTRACT

A specially formulated film or cover for weed, insect, temperature and moisture control, is located and held in place by decomposable or biodegradable plugs or anchor elements which serve as carriers and placement means for the planting element, such as a seed, seedling, cutting, tuber, or the like. The same plug also carries soil modifier or plant growth-promoting elements such as fertilizer, soil conditioner, insecticide, repellant, or the like, in proper relation with respect to the plant or planting element. The film or mulch layer preferably contains balanced nutrients or growth-promoting or control elements, being composed of material which controls water penetration and assists in regulating temperatures of the underlying soil. The film itself may be either of reusable type or decomposable to contribute growth-promoting materials to the soil. The plant husbandry thus obtained is claimed as a new agricultural method.

9 Claims, 10 Drawing Figures

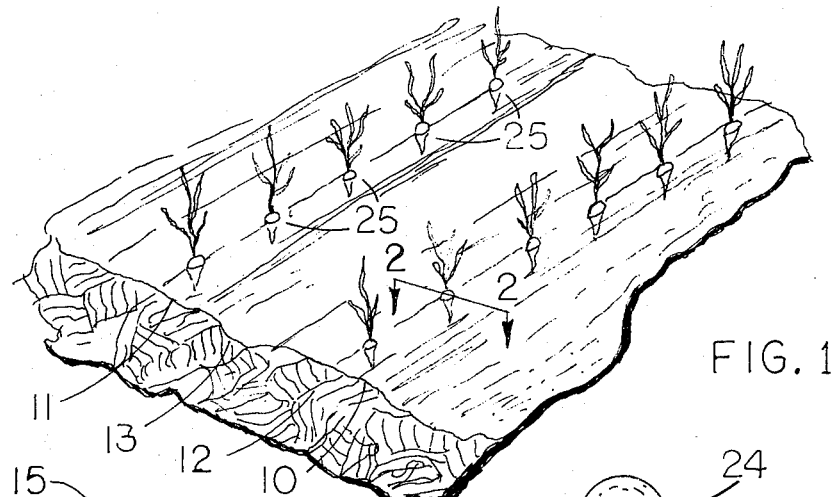
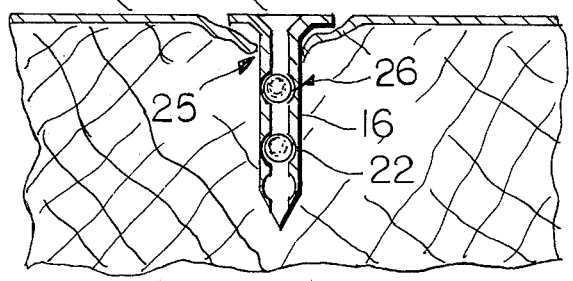
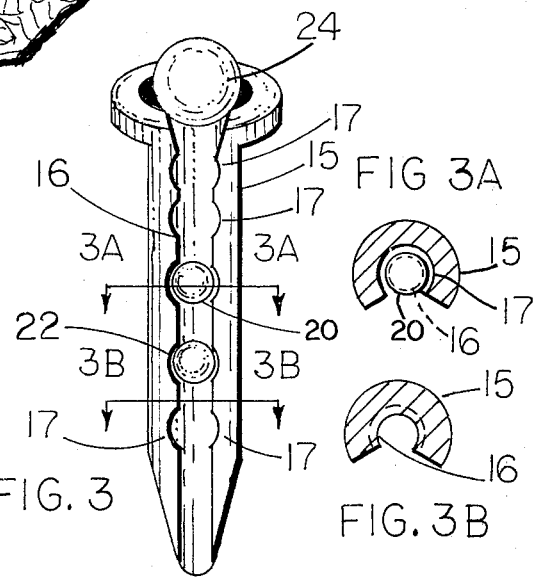
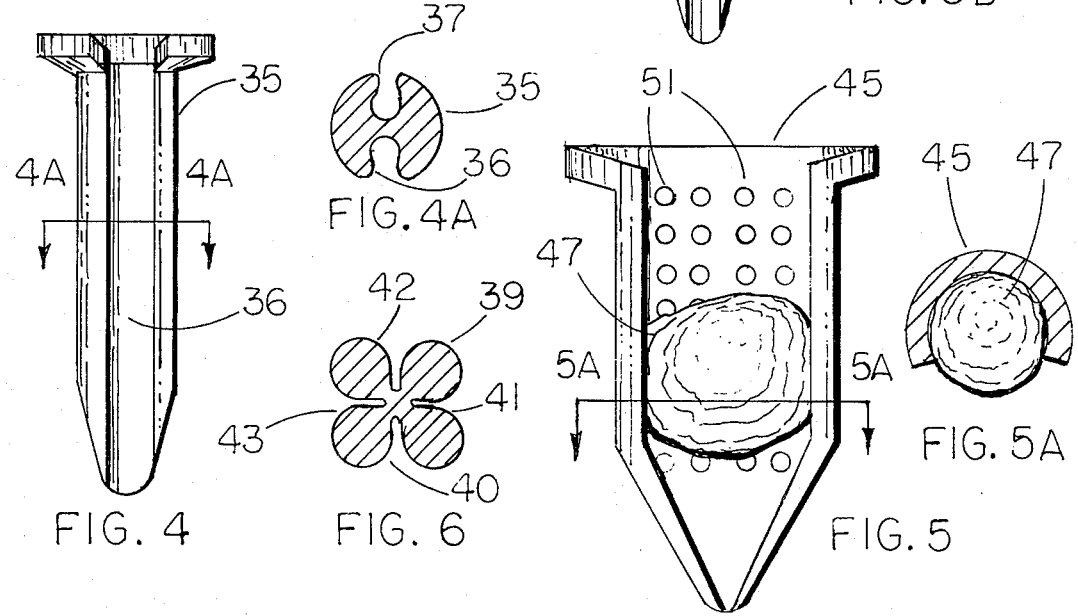

MEANS AND METHOD FOR PLANTING AND GROWING PLANTS AND CROPS

BACKGROUND AND PRIOR ART

The use of mulching materials in connection with the growth of plants in the soil has been practiced for many years. Some of these mulches consist of loose materials, such as leaves, straw, saw-dust, wood chips, and the like, which often interfere with plant development although they may be of some help in weed control or in getting seeds to germinate or tender plants to take root. More recently, it has been proposed to use sheet materials which can be placed near planted seeds to keep them warm, or moist, and/or to keep weeds from starting before the plants can come up, etc. The use of papers of various types for mulching has often been suggested, as in U.S. Pat. No. 1,870,110, or specially woven fabrics, as in U.S. Pat. No. 3,252,250, or a material made up of fibers and the sludge from treated sewage, as in U.S. Pat. No. 1,931,248, and many other variations. Materials which can be poured on or sprayed on the surface of the ground and then will set up to form a film or mulch have been widely suggested. Solutions of asphalt or similar materials, have been sprayed over rows of newly planted corn, for example, to expedite its germination, supposedly giving some additional warmth which promotes early germination. U.S. Pat. No. 1,962,806 suggest that a slurry of paper fibers be sprayed on the ground, much as they are distributed on the Fourdrinier screen in paper making, to form a fibrous blanket, it which fertilizer ingredients may be incorporated, if desired, to be leached out by water or left in the soil when the mulch material ultimately deteriorates.

In more recent years, especially since the thin and relatively inexpensive olefinic polymer films, such as polyethylene, polypropylene and their variants have become available, many suggestions have been made for the use of transparent films, opaque films, and semi-transparent films, having various heat transmitting properties and/or light reflective or transmitting properties. Some of the authors appear to contend that the film adds heat and is increased by use of dark or opaque films; others appear to think that night radiation may lose more heat than is gained in daytime, and that the film should incorporate special controls over light and heat penetration, either by day or by night, may be needed. See U.S. Pat. No. 3,252,250, for example.

Authorities are in conflict, also, as to whether the mulch materials should decompose quickly, or should last for several growing seasons, for reasons of economy. A number of patents show special compositions of film which are specifically intended to degrade, crumble, or otherwise decrepitate or decompose within a single growing season, so as to be assimilated into the soil. Examples are U.S. Pat. Nos. 3,320,695; 3,274,731; 3,590,528; 3,673,134; 3,679,777; and 3,454,510. The latter suggests incorporating in the film an ingredient, such as an organo-metallic salt, which will stimulate plant growth by oxidative activity. Many other variations have been proposed.

For placing and securing the film on the ground, various machines and processes have been designed. Some of these are incorporated in planting machines, i.e., in machines which place the seeds or small plant elements in the ground and then spread or stretch the film over them, or which will punch or burn holes in the sheeting through which the seed or plants may emerge. One of the problems with these is that, even if properly aligned in the first place, the holes do not always remain in alignment with the openings. The plants may be killed in this case as effectively as the weeds are supposed to be. It is obviously of importance to have the seed, seedling or plant emerge through the cover at the right time and in the right place. See U.S. Pat. Nos. 3,175,524; 3,184,889; 3,176,635; 3,315,623; and 3,333,557 for a number of arrangement. U.S. Pat. Nos. 3,171,371 and 3,180,290, have still other modifications for planting through a film laid by the same machine. Several methods are suggested for holding the film in place on the ground, including placing some of the dirt on its marginal edges. Winds often pull the films loose and shift them, even when the edges are so covered. One of the objects of the present invention is to make more certain that the plants will emerge at the proper places and not be smothered by a shifting overlying sheet.

Still other problems have drawn the attention of prior art investigators. One of these concerns the proper and economical application of soil modifiers, fertilizers, etc., in such a way as to assist the plants to grow properly. In many cases where fertilizer is added there is not sufficient fertilizer at the point where it is needed. Obviously, fertilizer or other nutrient materials which spread all over the ground or throughout the full area of a nutrient-contributing cover sheet will be largely wasted if they are too far from the plants to contribute significantly to their growth. An important object of the present invention is to make sure that nutrients added are in proper position to contribute maximum benefits to the plants. Soil erosion may be reduced or eliminated, along with better control over weeds and unwanted growth.

The labor and cost of repeated cultivation of many kinds of crops imposes serious economic burdens on many producers. Most soils tend to become packed when rain falls on them; the same is true for irrigated soils. In order to allow plant rootlets to penetrate the soil, and to aerate it, frequent tillage is necessary in conventional practice. It is an important object of the present invention to reduce and in some cases to eliminate entirely the necessity for such tillage, by controlling the access of water to the soil, limiting it to those points where plants are growing. In the case of arid lands, this also makes more efficient use of available water.

Growth-promoting agents for soils may include not only soil conditioners or other modifiers, fertilizers and plant nutrients, as such, but also those materials which give protection or strengthen the soil or the plant itself against its natural enemies, such as insects, worms, fungi, molds, etc. Thus, within the terms of the present invention, such materials as weed killers, insecticides, larvacides, insect or animal repellants, fungicides, soil conditioners, as well as trace elements and the usual nutrients and fertilizer ingredients may all be considered broadly to be plant growth agents or growth-promotors. To locate these materials in proper proximity to the seeds, plants, tubers, cuttings or other planting elements, in order that they will confer maximum benefit on the plant as it grows is a further object of the present invention.

The cover sheet, which may be referred to as a film or mulch sheet, is not necessarily a waterproof film or layer, such as a sheet of polythene (polyethylene) or the like, although it may be. It may be partly or largely water soluble, or it may be biodegradable, i.e., subject to attack by micro-organisms or soluble in water or decomposable in soil, e.g., by natural ingredients in the soil, so as to decompose within a growing season or even during a shorter period, if desired. Thus it may be a felted or pulped sheet, formed of fibrous and/or other organic materials, much as paper is formed, or it may be quite moisture proof. Depending on the available water supply, natural rainfall or other precipitation, the sheet may be chosen to hold back water except at the points where plants are located, thus directing all available water to them. It may allow limited penetration in all areas, if desired. It may be water-repellant rather than water-proof. It may include a water soluble binder for fibrous materials which themselves do not decompose rapidly but which will come apart as the binder is gradually abstracted from it. The sheet, in part or as a whole, may be subject to oxidative deterioration or to decomposition by the action of ultra-violet radiation from the sum. In any case, it is chosen so as to fulfill its function which is to protect the plant, at least during its critical starting stages, and to destroy or render innocuous, the natural enemies of the plant, such as weeds, insects, etc. Depending upon need, the sheet material may be designed to absorb heat from the sun, or may insulate against undue solar or night radiation, or against other heat losses at night, thus maintaining a growing temperature in the soil which is somewhat higher than normal. This is particularly advantageous for getting valuable crops started and on the market a few days ahead of the normal growing seasons when better prices usually can be obtained. By proper use, the cover sheet can greatly reduce or eliminate cultivating and irrigation operations, and promote better yields of agricultural product. Farm schedules can be improved, with resulting economy.

Likewise, the page or plugs which hold the sheet in place and also hold the planting or plant generating elements, which may be seeds, plants, bulbs, cuttings, etc., at the right depth in the soil and in alignment with openings in the cover sheet, may be made up of material which decomposes more or less rapidly while also containing some or all of the needed plant growth-promoting agents, including any or all of those mentioned above. These plugs or pegs may be of various sizes, appropriate for the particular plant or seed, etc., ranging from the size of a golf tee or smaller to a much larger size for accommodating plantable materials, as required. For planting bulbs, for example, the plugs may be sized to hold the bulb in such a position that it will grow into up and out of the soil through an open sided channel provided in the plug for that purpose. In all cases, a side channel or passageway is provided in the peg or plug so that plant, whether a slender sprout from a seed, or a small plant having a body, a cutting from a tuber, or any other growth propagating element, will be guided surely and directly upward through the soil and with accuracy through the opening in the cover sheet, whereas undesired plants such as weeds that may be all around the desired plant will be suppressed and killed or barred from growth by the cover sheet. As will be explained more fully hereinafter, the plug or peg also is designed, preferably, to supply a specific growth promoting element which it locates with accuracy at a point at the optimum spacing from the plant element to confer the benefit desired.

In the prior art, aside from the problem of aligning plants with preformed openings in a mulch or cover sheet, there has often been a problem of getting water to the desired plant rather than letting it promote weeds and other undesirable growth. An object of the present invention is to make certain that water input to the plant can be and will be properly controlled. By proper design, this is accomplished by the use of channeled pegs or plugs which not only locate the plant generating elements at proper depth in the soil but serve also to keep the cover sheet in proper place, at least until the sheet, or the plugs themselves, have performed their proper function. Thus the plugs are designed for several functions, namely to form the cover sheet openings, to hold the sheet in place, to locate the plants properly with respect to each other, and at the right depth as well as properly spaced laterally, and to locate plant nutrients or other growth promoting materials adjacent to and spaced with respect to the accompanying plant where they will do the most good.

Other objects and advantages will appear from the detailed description which follows. Inherent in the process are economies of labor, machinery use, fuel use, manual labor, and various other conventional operations are reduced or eliminated. Planting may be closer to fences and boundaries, effecting further economies.

BRIEF DESCRIPTION OF DRAWINGS

FIG. 1 is a general perspective view of an area for planting, covered by a cover sheet which is staked in place by plant locating and guiding plugs or pegs.

FIG. 2 is a sectional view showing a sheet and a plug element installed in the ground, taken, e.g., along line 2—2 of FIG. 1.

FIG. 3 is an elevational view of a typical plug or anchor element; FIGS. 3A and 3B are sectional views taken substantially and respectively along lines 3A—3A and 3B—3B of FIG. 3.

FIGS. 4 and 4A are respectively similar views, in elevation and in section, of an anchor plug or peg of a somewhat different form from that of FIG. 3.

FIG. 5 shows another modification of an anchor tube or plug designed for use with planting elements larger than usual seeds, such as a bulb or tuber. FIG. 5A is a section.

FIG. 6 is a sectional view of still another plug modification.

DESCRIPTION OF PREFERRED EMBODIMENT

Referring now to the drawings, a plot or ground is shown in FIG. 1, covered by a sheet 10 of material which will exercise the desired control over moisture, weeds, and/or temperature. Sheet 10 may be of any of the materials previously referred to, such as a water impermeable film of polyethylene. It is preferably opaque, however, with the film material containing a pigment such as carbon black. It may be only partly opaque, however, depending on the particular need, but it should have enough opacity to suppress or inhibit weeds by cutting off or reducing the light which reaches them and produces the photosynthesis essential to their growth. Sheet 10 may be continuous or may be applied only to the tops of rows 11, 12, where crops are to be grown, leaving an uncovered space 13 between rows. For full control, and to more fully eliminate need for cultivation as the crops grow, it is preferred that it cover the whole area to be planted. As first applied, it has no openings for plants. It may be premarked for guiding the planting.

Sheet 10, as shown in FIG. 2, is anchored or pinned down at intervals in both horizontal directions by pegs or plugs 15, each of which contains a vertical channel or slot 16 which extends preferably the full length of the plug and is open along one side to the soil. See FIG. 3. Each of these pegs or plugs 15 contains in channel 16 a plurality of pockets 17 each adapted to receive and to retain without substantial compression a seed or some other plant generating element. Such a seed is shown at 20, FIG. 3. It may include germination or rooting aids, hormones, etc., if desired. There are preferably several pockets 17 at different points along the path 15 i.e., in channel 16 so seeds requiring planting at different depths may be properly positioned in the plug. The plug is made of material which will eventually dissolve or crumble in the soil but when first driven, it is stiff and solid enough to penetrate the sheet 10 and to drive into the soil to its full length. Its length may vary widely; it may be as small as a golf tee or even smaller for some seeds while for others it may be much larger. It is preferably open along its front to form the channel 16 and its widened or enlarged pockets 17, in which the seed 20 or other planting element is inserted, manually or by machine, as will be obvious. One seed or several may be placed in each plug 15. A pellet 22 of fertilizer or any of the other growth promoting materials, or mixtures of them, may also be incorporated in the same plug. Such a pellet may be a solid granule, or a capsule which will dissolve, eventually, in water to release its growth promoting contents to the soil. The pellet may be placed at any suitable point along channel 16 in the peg 15; spacing it suitably from the seed or other planting element 20, so that it will not interfere with germination but will later support growth by feeding the roots of the plant. In most cases, then, the pellet will be placed below the seed, tuber, or the like, so as to begin feeding it or otherwise protecting it, as the plant really begins to grow. In some cases, e.g., where the element 22 is a repellant, it may be desirable to place it above the seed or tuber, etc. Thus the provision of multiple pockets or sockets 17 along the plug makes it versatile for various uses.

As shown in FIG. 3, the top of a plug 15 has an enlarged opening to receive an enlarged capsule 24 or other container of liquid, semi-liquid, or slurry, which may be a fertilizer, nutrient, or may contain various other things, including insecticides, etc., as prviously listed. This is not always an essential feature but is often useful and desirable. This slurry may be or comprise any material, such as soil, to surround the seed, or any substance that will improve plant growth or provide a better growth environment.

Several important elements used in combination for practicing plant husbandry, characterize the method of the present invention. These are, basically, the overlying sheet or mulch layer 10, which controls moisture both going into and evaporating from the soil, thereby helping to limit or prevent the growth of all vegetation except that which is desired. The pegs or plug elements 15 which (a) keep the sheet in place, (b) locate plants with precision and align them accurately with holes formed (by the plug) in the sheet, (c) locate the planting element, which may be a seed, tuber, cutting, etc., at the proper depth in the soil, (d) hold and keep in proper position with respect to the planting element a growth promoting element at the proper spacing above or move usually below the planting element, and (e) when desired, hold a slurry or liquid growth promotor in position above the plant for further supplying its needs. The plant element, seed or other, is incorporated into the plug before the planting is accomplished, and the pellet, capsule or the like, of plant growth promoting material likewise is preferably put in place ahead of insertion of the plug in the soil. In this context, a "pellet" may be understood as including a capsule; it may contain any one or several of the growth promoting materials referred to above. The use of the liquid slurry to be released later is optional.

The sheet 10 may and preferably does comprise nutrient or other growth promoting elements incorporated into its substance, either during manufacture or by later addition. It may be subject to rapid, slower or nearly imperceptible degradation. It may be designed to decrepitate and combine with the soil in a few weeks, or in months, in a whole growing season, or it may be designed to survive several growing seasons. In most cases, it probably is not economical to have sheet 10 last more than one season; this will depend on relative costs of purchase and of rehandling, storing, etc. Obviously, the system of this invention is designed to reduce agricultural costs for many plants and plant products.

The relative arrangement of the elements normally preferred is shown in FIG. 2. However, the design of the plug or peg may be varied widely, as long as it provides the essential growth channel through which the sprouting or growing plant may be guided to the surface of the ground and with accuracy through the opening 25 in the sheet 10. FIG. 4 shows a plug 35 having two vertical open side channels 36, 37, one on either side. It may be used for double plantings, if desired. In FIG. 6 another modification 39 is shown having four exposed channels or grooves 40, 41, 42 and 43. In all cases, these grooves are large enough to accommodate the growing plant until the plug itself deteriorates or dissolves enough that it will not interfere with futher growth. Seed or pellet-holding pockets similar to pockets 17, FIG. 3, may be formed in each of these channels.

FIG. 5 shows a plug 45 of larger diameter, designed of arcuate cross-section to accommodate a tuber, bulb, or the like 47. Openings 51 may be provided in the walls in addition to the open side channel to allow moisture to flow outwardly into the soil; this applies also to the other forms of plug as shown in FIGS. 2, 3, 4 and 6. It will be obvious that many other designs or cross sectional shapes may be used for the pegs or plugs, which should be appropriately formed to hold seeds, etc., as needed.

It is intended by the claims which follow to cover the invention and the various modifications and changes described above, along with many others which will suggest themselves to those skilled in the art, but which are properly within the spirit and purpose of the present invention, as broadly as the state of the art properly permits.

What is claimed is:

1. Mulching equipment or system for promoting growth of desired plants and suppressing others which comprises, in combination:

a. A continuous cover sheet for placement on the ground over an area to be planted, said sheet being sufficiently impervious to control moisture and being puncturable by peg means next described, and b. Plural peg means, each of which is decomposable or degradabe in the soil but sharp and rigid enough to be driven through said penetrate said sheet, each peg means having an element for limiting its penetration into the ground and having at least one side channel which is open to the side throughout substantially the full length of the peg means, said channel being formed to effectively guide the plant upward and through the penetration in the sheet made by the peg means and comprising plant retention element means for holding a plant element such as a seed or seedling at the proper depth in the soil when the peg means is driven to its penetration limit in the soil.

2. A system according to claim 1 in which a seed and a pellet of plant-growth-promoting substance is included in each plug.

3. A system according to claim 1 in which each plug further includes means for holding a supply of liquid plant growth promotor.

4. A system according to claim 1 in which each plug contains a pellet of fertilizer material.

5. A system according to claim 4 in which the pellet is a water soluble capsule enclosing a plant growth promoting substance.

6. A system according to claim 1 in which the sheet is degradable on the ground and includes plant growth promoting substances which will be released into the soil as the sheet degrades.

7. The method of growing plants at spaced intervals from each other over a planting area, which comprises placing a cover sheet having substantial moisture-controlling and weed-suppressing properties over said area, pre-positioning plant generating elements, such as seeds and the like, and retaining at least one such element in an open side channel in each of a plurality of drivable peg means capable of piercing a hole in the cover sheet and penetrating the soil thereunder, then driving all said peg means, spaced at said intervals or distances from each other, through said sheet to hold it in place over said area while thereby inserting the plant generating element to proper planting depth in said soil, the side channel in each of said peg means serving as a conduit or passageway to guide the plant, as it grows from said soil, upwardly and through the hole formed by said peg means in the cover sheet.

8. A method according to claim 7 in which plural side channels are provided for each peg means.

9. A method according to claim 7 in which each plug comprises plant nutrient material and is degradable in the soil to supply plant growth promoting substances to the plant held thereby as said plug degrades.

* * * * *